US011224006B2

(12) United States Patent
Ljung

(10) Patent No.: US 11,224,006 B2
(45) Date of Patent: *Jan. 11, 2022

(54) APPARATUS AND METHODS FOR ANONYMOUS PAIRED DEVICE DISCOVERY IN WIRELESS COMMUNICATIONS SYSTEMS

(71) Applicant: Sony Mobile Communications AB, Lund (SE)

(72) Inventor: Rickard Ljung, Helsingborg (KR)

(73) Assignee: Sony Group Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/791,801

(22) Filed: Jul. 6, 2015

(65) Prior Publication Data
US 2015/0312848 A1 Oct. 29, 2015

Related U.S. Application Data

(63) Continuation of application No. 13/679,631, filed on Nov. 16, 2012, now Pat. No. 9,088,933.

(51) Int. Cl.
*H04W 48/16* (2009.01)
*H04W 72/04* (2009.01)
(Continued)

(52) U.S. Cl.
CPC .......... *H04W 48/16* (2013.01); *H04L 5/0048* (2013.01); *H04W 8/005* (2013.01); *H04W 12/02* (2013.01)

(58) Field of Classification Search
CPC ... H04W 48/16; H04W 76/023; H04W 12/02; H04W 8/005; H04W 8/00; H04W 76/14;
(Continued)

(56) References Cited

U.S. PATENT DOCUMENTS 9,014,104 B2 * 4/2015 Li .................. H04W 52/242
370/316
9,247,411 B2 * 1/2016 Wu .................. H04W 8/005
(Continued)

FOREIGN PATENT DOCUMENTS

EP 2 015 606 A1 1/2009
EP 2015606 A1 * 1/2009 .............. H04W 8/00
(Continued)

OTHER PUBLICATIONS

Notification of Transmittal of the International Search Report and the Written Opinion of the International Searching Authority, or the Declaration, PCT/IB2013/002295, dated Mar. 18, 2014, 10 pages.
(Continued)

*Primary Examiner* — Edan Orgad
*Assistant Examiner* — Vanneilian Lalchinthang
(74) *Attorney, Agent, or Firm* — Tucker Ellis LLP

(57) ABSTRACT

A wireless communications system transmits a first message including an anonymous discovery pilot identification code to a first terminal, receives a second message from a second terminal and determines whether the second message identifies the discovery pilot identification code. The system may transmit a third message identifying the first terminal to the second terminal responsive to the second message identifying the discovery pilot identification code. Transmission of the first message may be preceded by receiving a request message from the first terminal requesting permission to transmit a discovery pilot signal.

23 Claims, 3 Drawing Sheets

(51) Int. Cl.
*H04L 9/00* (2006.01)
*H04B 17/00* (2015.01)
*H04W 36/00* (2009.01)
*H04B 15/00* (2006.01)
*H04L 12/28* (2006.01)
*H04W 12/02* (2009.01)
*H04L 5/00* (2006.01)
*H04W 8/00* (2009.01)

(58) Field of Classification Search
CPC ... H04W 4/70; H04W 74/0825; H04W 84/18; H04W 72/085; H04W 92/18; H04L 5/0048; H04L 67/104; H04L 67/1061; H04L 67/16; H04L 12/43; H04B 7/022; H04B 7/155; H04B 7/2606
USPC .......................................................... 370/254
See application file for complete search history.

(56) References Cited

U.S. PATENT DOCUMENTS

| | | | | |
|---|---|---|---|---|
| 2003/0073444 | A1* | 4/2003 | Kogiantis | H04W 72/1231 455/452.1 |
| 2004/0162871 | A1* | 8/2004 | Pabla | H04W 8/005 709/201 |
| 2006/0168343 | A1* | 7/2006 | Ma | H04W 52/38 709/245 |
| 2006/0171332 | A1* | 8/2006 | Barnum | H04W 8/005 370/254 |
| 2010/0135234 | A1* | 6/2010 | Nanda | H04W 48/12 370/329 |
| 2010/0165882 | A1* | 7/2010 | Palanki | H04W 8/005 370/254 |
| 2010/0167743 | A1* | 7/2010 | Palanki | H04B 7/155 455/436 |
| 2010/0317291 | A1* | 12/2010 | Richardson | H04W 74/0825 455/63.1 |
| 2011/0085453 | A1* | 4/2011 | Wu | H04L 5/0007 370/252 |
| 2011/0085620 | A1* | 4/2011 | Measson | H04L 1/0075 375/299 |
| 2011/0268274 | A1* | 11/2011 | Qiu | H04L 9/0844 380/270 |
| 2012/0163235 | A1* | 6/2012 | Ho | H04L 67/1061 370/254 |
| 2012/0323717 | A1* | 12/2012 | Kirsch | G06Q 20/0855 705/26.1 |
| 2012/0324242 | A1* | 12/2012 | Kirsch | H04L 63/08 713/189 |
| 2012/0324553 | A1* | 12/2012 | Garcia Bernardo | G06F 21/6209 726/6 |
| 2013/0117276 | A1* | 5/2013 | Hedditch | H04L 67/306 707/747 |
| 2013/0159522 | A1* | 6/2013 | Hakola | H04L 29/06027 709/225 |
| 2014/0112194 | A1* | 4/2014 | Novlan | H04W 8/005 370/254 |

FOREIGN PATENT DOCUMENTS

| | | |
|---|---|---|
| JP | 2012523172 A | 9/2012 |
| JP | 2013524640 A | 6/2013 |
| WO | WO 2009/009362 A1 | 1/2009 |
| WO | WO 2010/078271 A2 | 7/2010 |
| WO | 2010114931 A2 | 10/2010 |
| WO | 2011123516 A2 | 10/2011 |
| WO | WO 2011/130623 A2 | 10/2011 |

OTHER PUBLICATIONS

Japanese Office Action Corresponding to Japanese Patent Application No. 2015-542365; dated Jun. 14, 2016; Foreign Text, 6 Pages, English Translation Thereof, 4 Pages.
Korean Office Action Corresponding to Korean Patent Application No. 10-2015-7012603; dated Feb. 17, 2016; Foreign Text, 5 Pages, English Translation Thereof, 3 Pages.
3GPP TS 23.303, V13.2.0, Dec. 2015, 3rd Generation Partnership Project; Technical Specification Group Services and System Aspects; Proximity-based services (ProSe); Stage 2 (Release 13), 122 Pages.

* cited by examiner

APPARATUS AND METHODS FOR ANONYMOUS PAIRED DEVICE DISCOVERY IN WIRELESS COMMUNICATIONS SYSTEMS

CROSS-REFERENCE TO RELATED APPLICATIONS

This application is a continuation of U.S. application Ser. No. 13/679,631, filed Nov. 16, 2012 in the United States Patent and Trademark Office.

BACKGROUND OF THE INVENTION

The inventive subject matter relates to wireless communications and, more particularly to device discovery in wireless communications.

A mobile terminal in a wireless mobile network typically only communicates with one or more network base stations. However, it is often useful to have knowledge about other mobile terminals that currently are located in relatively close proximity. For example, such information may be of use for local remote controlling or finding friends in the neighborhood (e.g., for gaming, localized commercials, automatic alarm system control, etc.).

In order to discover devices being within the same area, one can utilize Internet-based so-called "over the top" services. Such approaches may involve a terminal using its GPS receiver to find its position and transmitting the position coordinates to a server located on the Internet. The server may identify other devices that are within a certain proximity to the terminal. However devices to be found may need to use the same non-standardized system for discovery, and there may be integrity and security issues with transmitting position information to a central database.

SUMMARY

Some embodiments of the inventive subject matter provide methods of operating a wireless communications system. The methods include transmitting a first message including an anonymous discovery pilot identification code to a first terminal, receiving a second message from a second terminal and determining whether the second message identifies the discovery pilot identification code. The methods may further include transmitting a third message identifying the first terminal to the second terminal responsive to the second message identifying the discovery pilot identification code. Transmission of the first message may be preceded by receiving a request message from the first terminal requesting permission to transmit a discovery pilot signal.

In some embodiments, transmission of the first message may be preceded by receiving at least one message identifying a relationship between the first and second terminals. Receiving at least one message identifying a relationship between the first and second terminals may include receiving respective messages from the first and second terminals.

In some embodiments, transmission of the third message may be preceded by searching a database responsive to the second message identifying the discovery pilot identification code to determine whether the second terminal is paired with the first terminal, and wherein transmission of the third message may include transmitting the third message if the database indicates that the first and second terminals are paired.

Further embodiments provide wireless communications systems configured to perform such methods.

Additional embodiments provide methods of operating a wireless communications terminal. The methods include receiving a message including an anonymous discovery pilot identification code from a wireless communications system and transmitting a discovery pilot signal including the discovery pilot identification code. Receipt of the message including the discovery pilot identification code may be preceded by transmitting a message to the wireless communications system requesting permission to transmit a discovery pilot signal. Transmission of the message to the wireless communications system requesting permission to transmit the discovery pilot signal may be preceded by identifying a pairing relationship with another terminal to the wireless communications system. Identifying the pairing relationship may include transmitting a message identifying the pairing relationship to the wireless communications system.

Further embodiments provide wireless communications terminals configured to perform such methods.

Still further embodiments of the inventive subject matter provide methods of operating a wireless communications terminal. The methods include receiving at least one discovery pilot signal, recovering at least one anonymous discovery pilot identification code from the at least one received discovery pilot signal, transmitting a message to a wireless communications system identifying the recovered at least one discovery pilot identification code and receiving a message identifying another terminal associated with the at least one discovery pilot identification code from the wireless communications system. Receipt of the at least one discovery pilot signal may be preceded by identifying a pairing relationship with the other terminal to the wireless communications system.

Further embodiments provide wireless communications terminals configured to perform such methods.

BRIEF DESCRIPTION OF THE DRAWINGS

Other features of the inventive subject matter will be more readily understood from the following detailed description of specific embodiments thereof when read in conjunction with the accompanying drawings, in which.

DETAILED DESCRIPTION

Figure 1:
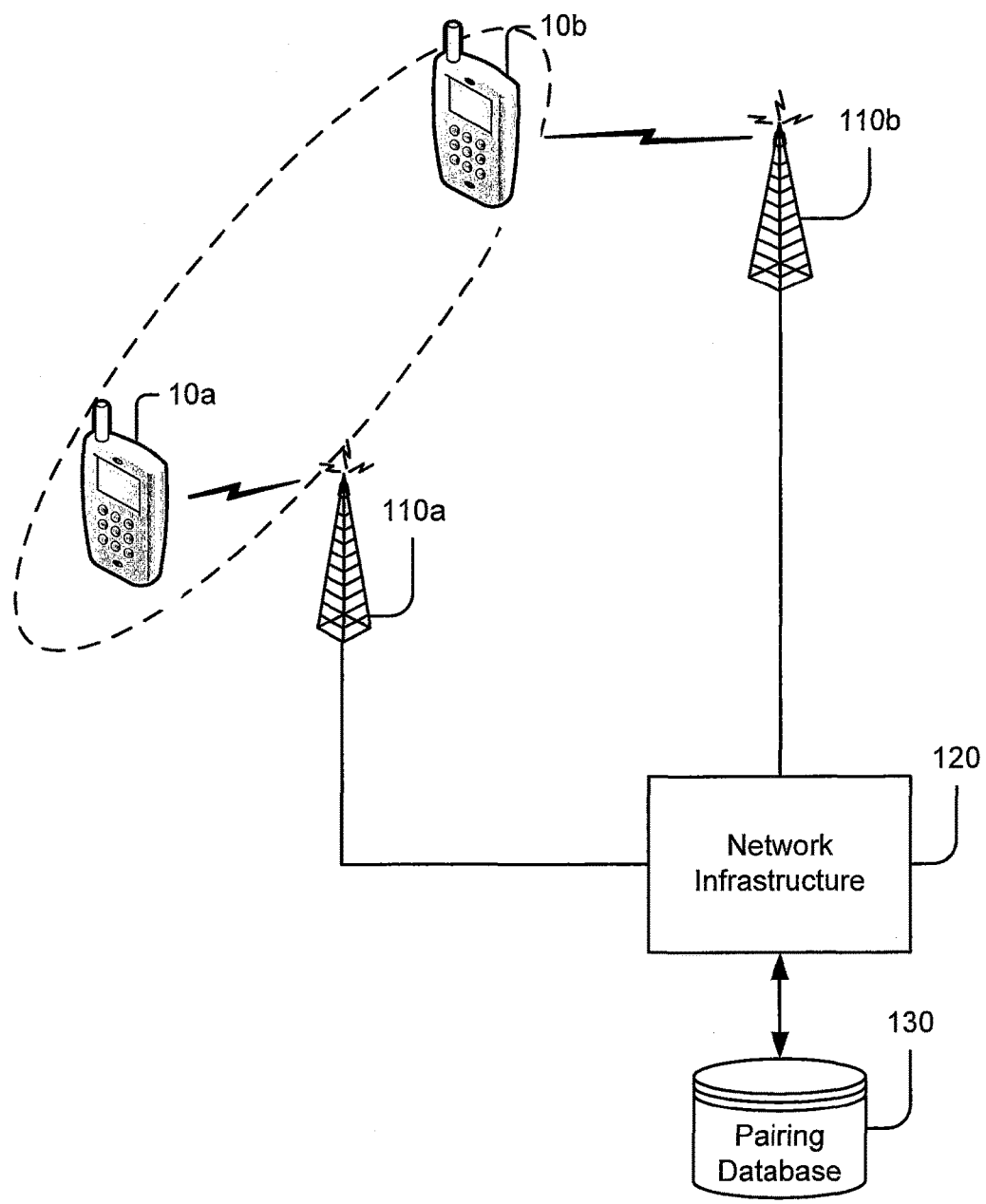
FIG. 1 is a schematic diagram illustrating a wireless communications system according to some embodiments.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The inventive subject matter may be embodied as methods, electronic devices, and/or computer program products. Accordingly, the inventive subject matter may be embodied in hardware and/or in software (including firmware, resident software, micro-code, etc.). Furthermore, the inventive subject matter may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, a "terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Terminals may also be referred to as "pervasive computing" devices.

Some embodiments of the inventive subject matter stem from a realization that a wireless communications network, e.g., a cellular network, can be used to support an anonymous device discovery process that may be used by paired terminals to locate one another without requiring position determination or exchange of position information. Rather, in some embodiments, a terminal in communication with the wireless network may be allowed to transmit its own temporarily assigned tracking signal. The tracking signal may use a network-assigned discovery pilot identification code that does not reveal the identity or location of the transmitting terminal and may be transmitted, for example, using a reserved portion of the radio resource used by the network. Other terminals within proximity of the transmitting terminal may receive and decode the tracking signal to recover the network-assigned discovery pilot identification code and, in response to providing the recovered discovery pilot identification code to the network, be informed of the presence of the other terminal.

FIG. 1 illustrates a wireless communications system 100 according to some embodiments. The system 100 includes one or more wireless network access nodes, here shown as wireless base stations 110*a*, 120*b*. It will be appreciated that the base stations 110*a*, 110*b* may include, for example, conventional cellular network base stations and/or access points or other devices that provide similar functionality in wide and/or local area wireless networks. The base stations 110*a*, 110*b* may serve respective overlapping or non-overlapping geographical areas and/or the same or different populations of users or subscribers. The base stations 110*a*, 110*b* may utilize the same or different radio resources. For example, the base stations 110*a*, 110*b* may serve respective geographical cells of the same cellular communications network using a common radio resource and/or a common protocol, or may be stations of different networks that utilize different radio resources under different protocols.

The base stations 110*a*, 110*b* are coupled to other network infrastructure 120. The network infrastructure 120 may comprise the core network of a given cellular system to which the base stations 110*a*, 110*b* belong (e.g., switching centers and other backbone network components that support the base stations 110*a*, 110*b*) or, in case in which the base stations 110*a*, 110*b* are from different networks, may comprise a combination of components of multiple networks. The network infrastructure 120 is configured to interoperate with a pairing database 130, which may support a pairing discovery functionality that may be provided by the network infrastructure 120 as described in detail below. The pairing database 130 may be maintained by an operator of the system 100 and/or may be an external database accessible via the Internet.

Wireless terminals 10*a*, 10*b* are configured to communicate with at least one of the base stations 110*a*, 110*b*. As further shown in dotted line, the wireless terminals 10*a*, 10*b* are in a paired relationship. The pairing may take various forms and can be achieved in many different ways. For example, the terminals 10*a*, 10*b* may be paired using NFC, Bluetooth or other short-distance communications and/or by longer distance communications via the Internet. The pairing may be for any of a variety of purposes, such as for conducting commercial services or facilitating interest group participation. The pairing may or may not entail direct communications between the terminals 10*a*, 10*b*. Although FIG. 1 illustrate the terminals 10*a*, 10*b* in communication with respective base stations 110*a*, 110*b*, it will be appreciated that communications of the terminals 10*a*, 10*b* to support discovery processes according to various embodiments may utilize a single base station or access node, or may utilize multiple base stations or access nodes.

Figure 2:
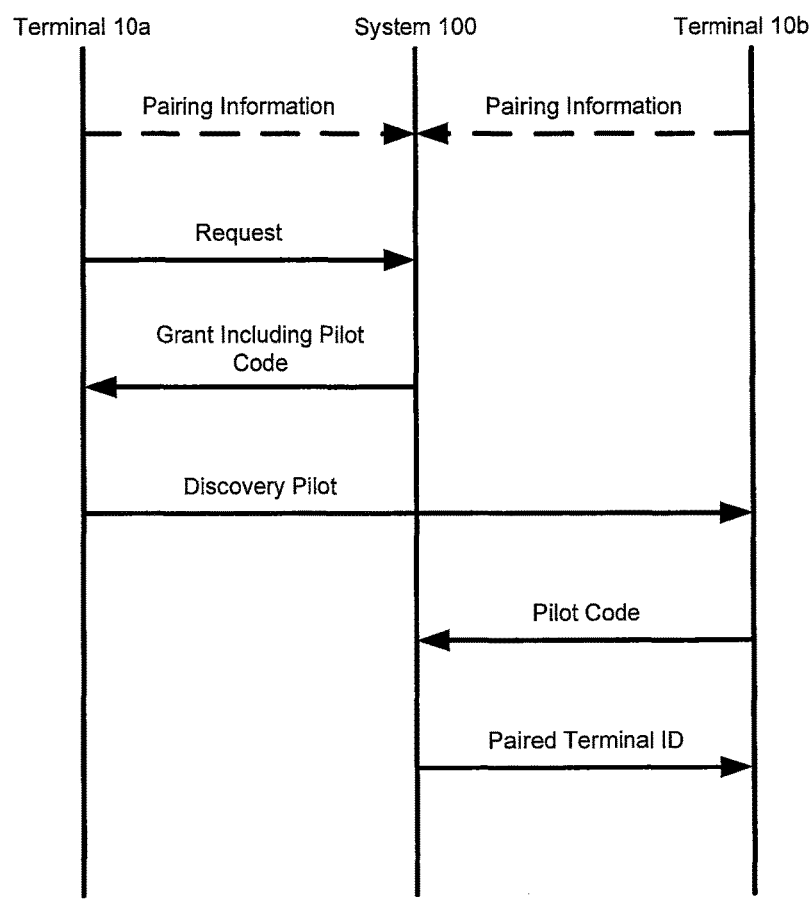
FIG. 2 is a diagram illustrating messaging in the wireless communications system of FIG. 2.

FIG. 2 illustrates message flow for a discovery process according to some embodiments. Referring to FIG. 2 with continuing reference to FIG. 1, the first terminal 10a transmits a message to the wireless communications system 100 requesting permission to transmit a discovery pilot signal. This request message may be received, for example, by the first base station 110a. In response, the system 100 transmits a message to the first terminal 10a that grants the request and includes a discovery pilot identification code for transmission of the discovery pilot signal. This message may also include other control information, such as a transmit power level the first terminal 10a should use for its discovery pilot signal. Using the discovery pilot identification code and associated control information, the first terminal 10a transmits its discovery pilot signal.

The second terminal 10b receives the transmitted discovery pilot signal and extracts the discovery pilot identification code. After extracting the discovery pilot identification code, the second terminal 10b transmits a message identifying the recovered discovery pilot identification code to the system 100. In addition, the second terminal 10b may include other discovery pilot identification codes the second terminal 10b may have extracted from other received discovery pilot signals. The system 100 receives the message identifying the discovery pilot identification code for the first terminal 10a, and matches up the identified discovery pilot identification code with a non-anonymous terminal ID for the terminal 10a by, for example, referring to the pairing database 130. The system 100 then transmits a message to the second terminal 10b including the terminal ID for the first terminal 10a, thus informing the second terminal 10b of the proximity of the first terminal 10a. The second terminal 10a may use this information to perform operations relating to the paired relationship between the first terminal 10a and the second terminal 10b, such as direct or indirect communications between the first terminal 10a and the second terminal 10b.

Before the operations described above may be performed, a pairing relationship is established between the first terminal 10a and the second terminal 10b and communicated to the wireless communication system 100 to, for example, create appropriate entries in the pairing database 130. For example, as shown, after a pairing relationship is established, the first terminal 10a and the second terminal 10b may each send messages identifying the pairing relationship, which the system 100 may use to populate the pairing database 130.

In some embodiments, the information used for pairing may include an international mobile equipment identity (IMEI) unique to the device and/or a caller ID (telephone number) associated with a particular subscription. The pairing database 130 may establish correspondence between the IMEI and/or caller ID and a unique discovery pilot identification code as shown in Table 1:

TABLE 1

| Terminal ID | Paired Terminal ID | Discovery Pilot ID code |
|---|---|---|
| Terminal A IMEI | Terminal B IMEI | A |
| Terminal B IMEI | Terminal A IMEI | B |
| ... | ... | ... |

The discovery pilot identification codes may be assigned such that different terminals in the same area do not use the same code, but the discovery pilot identification codes are not required to be unique for all terminals in a system and can generally be reused to the extent that there is no undue likelihood of conflicts.

The radio resource available for any mobile communication system can be described as a certain amount of frequency band that can be utilized with a certain amount of total transmitted energy. Radio resource is often divided in time (e.g., as in time division multiple access (TDMA)) and/or parts of the frequency (e.g., as in frequency division multiple access (FDMA)), in order to distinguish different terminal and base station signals. In addition, codes can be applied to signal to achieve code division multiplexing (CDMA), wherein signals overlapping in time and frequency can be distinguished.

According to some embodiments of the inventive subject matter, terminals may transmit discovery pilot signals using overlapping time and frequency during defined transmission windows, such that a portion of the radio resource may be reserved for transmission of such discovery pilot signals. The techniques used for discovery pilot signal transmission may be similar, for example, to those used in the LTE standard for cell pilot signals ("reference signals"). To distinguish among discovery pilot signals, in some embodiments, terminals may encode their discovery pilot signals with the discovery pilot identification codes received from the system using a CDMA type spread spectrum coding.

When another terminal (e.g., terminal 10b in FIG. 1) conducts a search (automatically and/or by user command) for other terminals within proximity, it will monitor the discovery pilot signal time/frequency slots, much like it monitors cell pilot signal time/frequency slots. The allocated discovery pilot radio resource can be predefined by a standard and/or may be defined in a static or dynamic manner by the wireless communication system using system control channel signaling.

For each detected discovery pilot signal received, the receiving terminal may identify the discovery pilot identification code in a manner similar to that used by terminals in a cell search procedure. The discovered discovery pilot identification codes may be kept anonymous, thus providing the ability to prevent another agent from tracing or tracking terminal identity. In order for the terminal receiving discovery pilot identification codes to identify whether one or more of the discovered codes (and thereby terminals) are paired or otherwise associated with the receiving terminal, the receiving terminal sends the found discovery pilot identification codes to the wireless communication system, which analyzes the discovery data base and responds with an appropriate terminal and/or subscriber ID. This approach can provide a desirable level of security.

Figure 3:
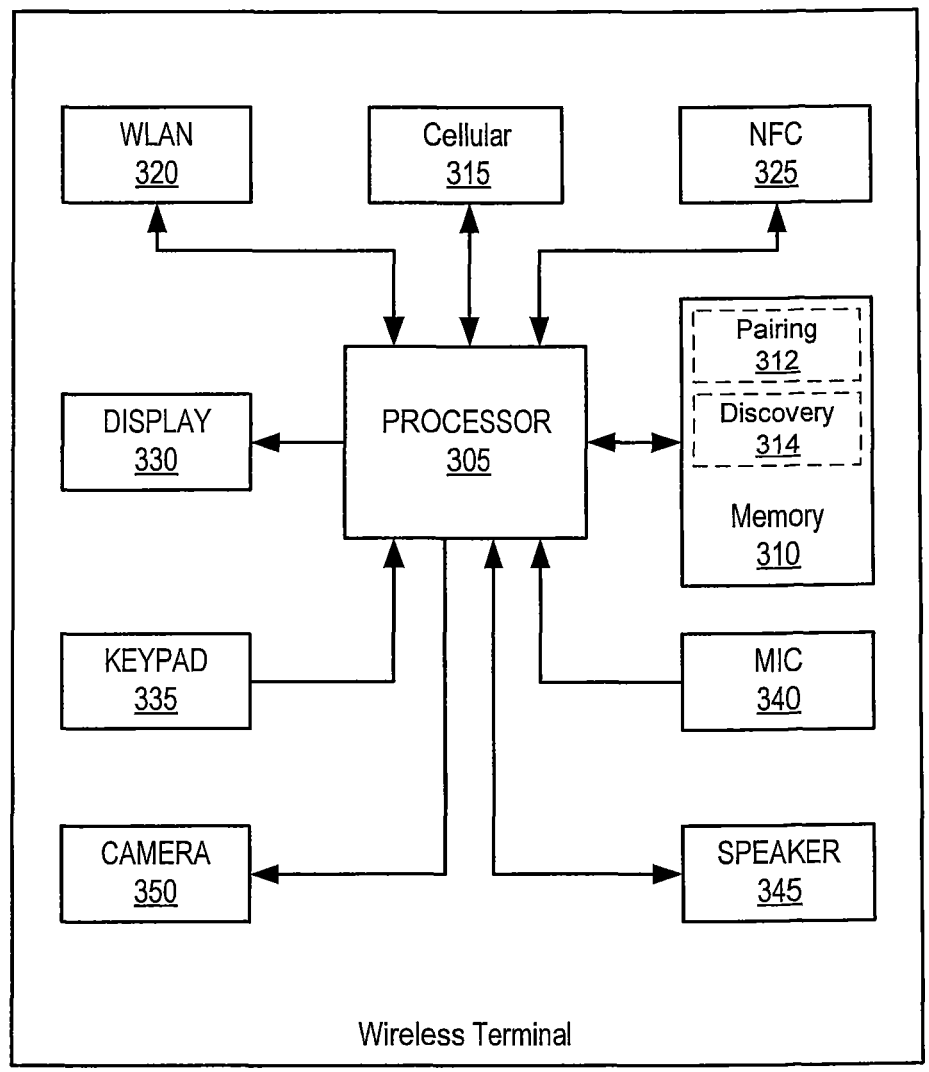
FIG. 3 is a schematic diagram illustrating a wireless communications terminal according to some embodiments.

FIG. 3 illustrates a wireless terminal 300 that may support the operations described above. As shown, the wireless terminal 300 includes a processor 305 (e.g., one more microprocessor and/or signal processor chips) configured to interoperate with a memory 310, which may be used to store executable code and data. The processor 305 may also be coupled to various communications circuits that can be used to support the functions described above. For example, the processor 305 may be coupled to a cellular radio communications circuit 315 that provides connectivity to cellular networks, a wireless local area network (WLAN) communications circuit 320 that supports local wireless communications (WiFi, Bluetooth and the like) and a near-field communications (NFC) circuit 325, which supports close range communications with other terminals or devices. The terminal 300 may also include user interface components that interoperate with the processor 305, such as a display 330, a keypad 335, a microphone 340, a speaker 345, and a camera 350.

The processor 305 and memory 310 may be configured to store and execute computer code that causes the wireless terminal 300 to perform the discovery pilot signal transmission, reception and message processing operations described above with reference to FIGS. 1 and 2. For example, the memory 310 may include executable code and data 312 configured to support pairing operations, along with executable code and data 314 configured to support discovery pilot signal encoding, transmission, reception, decoding and associated communications operations. As discussed above, these communications may involve cellular, WLAN and/or near-field communications.

Some embodiments of the inventive subject matter may be implemented in wireless communications standards, such as that defined by the 3GPP Specification, which covers GSM (including GPRS and EDGE), W-CDMA and LTE (including LTE-Advanced) specifications (the 3GPP specification is available at www.3GPP.org). For example, some embodiments may be specified by changes and/or additions to physical layer aspects defined at 3GPP TS 36.211, 36.212 and/or 36.213 and/or radio resource control aspects defined at 3GPP TS 36.331. It will be appreciated that these sections are cited as an example, and that embodiments of the inventive subject matter may be implemented in 3GPP or other communications specifications in a number of different ways.

Many variations and modifications can be made to the exemplary embodiments without substantially departing from the principles of the inventive subject matter. All such variations and modifications are intended to be included herein within the scope of the inventive subject matter, as set forth in the following claims.

That which is claimed:

1. A method of operating a first wireless communications terminal, the method comprising:
   transmitting a request message from the first wireless communications terminal to a wireless communications system requesting permission to transmit a discovery signal;
   receiving, at the first wireless communications terminal from one or more wireless network access nodes of the wireless communications system, at least a first message including a discovery code and control information for the first wireless communications terminal to use for transmitting the discovery signal; and
   transmitting, from the first wireless communications terminal to a second terminal according to the control information, the discovery signal including the discovery code,
   wherein the discovery signal is configured such that the discovery code included in the discovery signal can be received and recovered at the second terminal, and
   wherein the discovery signal enables the second terminal to retrieve information identifying the first wireless communications terminal associated with the discovery code from the wireless communications system.

2. The method of claim 1, wherein transmitting, from the first wireless communications terminal, the message to the wireless communications system requesting permission to transmit the discovery signal is preceded by identifying, to the wireless communication system, a pairing relationship between the first wireless communication terminal and the second terminal.

3. The method of claim 2, wherein identifying the pairing relationship comprises transmitting to the wireless communications system a message identifying the pairing relationship.

4. The method of claim 2, wherein identifying, to the wireless communication system, the pairing relationship is preceded by establishing the pairing relationship between the first wireless communication terminal and the second terminal via a communication system other than the wireless communication system.

5. A method of operating a first wireless communications terminal, the method comprising:
   receiving, at the first wireless communications terminal, at least one discovery signal from at least one second wireless terminal, the at least one discovery signal being transmitted in conformity with control information provided by one or more wireless network access nodes of a wireless communication system, and wherein the at least one discovery signal includes at least one discovery code received at the at least one second wireless terminal from the wireless communication system;
   recovering the at least one discovery code from the at least one received discovery signal;
   transmitting, from the first wireless communications terminal, a second message to the wireless communications system identifying the recovered at least one discovery code; and
   receiving, at the first wireless communications terminal, a third message identifying the at least one second wireless terminal or a user of the at least one second wireless terminal associated with the at least one discovery code from the wireless communications system.

6. The method of claim 5, wherein receiving, at the first wireless communications terminal, the at least one discovery signal is preceded by identifying, to the wireless communications system, a pairing relationship between the first wireless communication terminal and the at least one second wireless terminal.

7. The method of claim 6, wherein identifying the pairing relationship comprises transmitting to the wireless communications system a message identifying the pairing relationship.

8. The method of claim 6, wherein identifying, to the wireless communications system, the pairing relationship between the first wireless communication terminal and the at least one second wireless terminal is preceded by establishing the pairing relationship between the first wireless communication terminal and the at least one second terminal via a communication system other than the wireless communication system.

9. The method of claim 5, wherein the third message identifying the at least one second wireless terminal associated with the at least one discovery code comprises a terminal identification for the at least one second wireless terminal.

10. A wireless communications terminal comprising:
    a processor, wherein the processor is configured to:
    transmit a request message from the wireless communications terminal to a wireless communications system requesting permission to transmit a discovery signal;
    receive at least a first message from one or more wireless network access nodes of the wireless communications system, the first message including a discovery code and control information for the wireless communications terminal to use for transmitting the discovery signal; and
    transmit, according to the control information, the discovery signal including the discovery code to a second terminal, wherein the discovery signal is configured such that the discovery code included in the discovery signal can be received and recovered at the second terminal, and wherein the discovery signal enables the second terminal to retrieve information identifying the first wireless communications terminal associated with the discovery code from the wireless communications system.

11. The wireless communications terminal of claim 10, wherein the processor is further configured to:

identify to the wireless communications system, prior to transmitting the request message requesting permission to transmit the discovery signal, a pairing relationship between the first wireless communication terminal and the second terminal.

12. The wireless communications terminal of claim 11, wherein the processor is further configured to:

establish the pairing relationship between the first wireless communication terminal and the second terminal via a communication system other than the wireless communication system prior to identifying to the wireless communication system the pairing relationship with the second terminal.

13. The wireless communications terminal of claim 10, wherein the discovery code prevents identification of a terminal identity of the wireless communication terminal by a recipient of the discovery signal.

14. A wireless communications terminal comprising:

a processor, wherein the processor is configured to, receive at least one discovery signal from at least one second wireless terminal, the at least one discovery signal being transmitted in conformity with control information provided by one or more wireless network access nodes of a wireless communication system, and wherein the at least one discovery signal includes at least one discovery code received at the at least one second wireless terminal from the wireless communication system;

recover the at least one discovery code from the at least one received discovery signal;

transmit a second message to the wireless communications system identifying the recovered at least one discovery code; and receive a third message from the wireless communications system identifying the at least one second wireless terminal or a user of the at least one second wireless terminal associated with the at least one discovery code from the wireless communications system.

15. The wireless communications terminal of claim 14, wherein the processor is further configured to:

identify to the wireless communications system, prior to receiving the at least one discovery signal, a pairing relationship between the wireless communication terminal and the at least one other terminal.

16. The wireless communications terminal of claim 15, wherein the processor is further configured to:

perform, responsive to receiving the third message from the wireless communications system identifying the at least one other terminal, operations related to the pairing relationship between the wireless communications terminal and the at least one other terminal.

17. The wireless communications terminal of claim 15, wherein the processor is further configured to:

establish the pairing relationship between the wireless communication terminal and the at least one other terminal via a communication system other than the wireless communication system prior to identifying to the wireless communication system the pairing relationship with the at least one other terminal.

18. The method of claim 1, wherein neither the discovery code nor the discovery signal comprise a terminal identity of the first wireless communication terminal.

19. The method of claim 5, wherein neither the at least one discovery code nor the at least one discovery signal comprise a terminal identity of the at least one second wireless communication terminal.

20. The wireless communication terminal of claim 10, wherein neither the discovery code nor the discovery signal comprise a terminal identity of the wireless communication terminal.

21. The wireless communication terminal of claim 14, wherein neither the at least one discovery code nor the at least one discovery signal comprise a terminal identity of the at least one other terminal.

22. The method of claim 1, wherein the wireless communication system is configured to provide identification of the first wireless communications terminal to the second terminal based on the wireless communication system storing a pairing relationship between the first wireless communication terminal and second terminal that associates the first wireless communication device with the discovery code.

23. The method of claim 5, wherein the third message is received from the wireless communications system based on the first wireless communications terminal being permitted to discover the at least one second wireless terminal according to a pairing relationship stored on the wireless communication system.

* * * * *